United States Patent Office 3,752,871
Patented Aug. 14, 1973

3,752,871
O - ALKYL - N-MONOALKYL-S-(N'-ACYL-CARBAMYLMETHYL) - THIONOTHIOLPHOSPHORIC ACID ESTER AMIDES
Claus Stolzer, Wuppertal-Vohwinkel, Bernhard Homeyer, Opladen, and Ingeborg Hammann, Cologne, Germany, assignors to Bayer Aktiengesellschaft, Leverkusen, Germany
No Drawing. Filed July 22, 1971, Ser. No. 165,411
Claims priority, application Germany, July 30, 1970,
P 20 37 855.6
Int. Cl. H01n 9/36; C07f 9/16, 9/24
U.S. Cl. 260—938       7 Claims

ABSTRACT OF THE DISCLOSURE

O-alkyl-N-monoalkyl - S - (N'-acyl-carbamylmethyl)-thionothiolphosphoric acid ester amides of the general formula

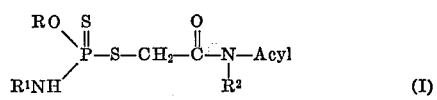
(I)

in which

R and $R^1$ each is an alkyl or alkenyl radical with up to 6 carbon atoms,
$R^2$ is hydrogen or an alkyl or alkenyl radical with up to 6 carbon atoms, and
Acyl is an HCO-, alkyl-CO- or alkoxy-CO- radical optionally substituted by halogen or a phenyl-CO-or phenoxy-CO- radical optionally substituted by halogen or an alkyl radical,
which possess nematocidical, insecticidal, acaricidal, and plant growth-promoting properties.

---

The present invention relates to and has for its objects the provision of particular new O-alkyl-N-monoalkyl-S-(N' - acyl - carbamylmethyl)-thionothiolphosphoric acid ester amides, i.e. O-alkyl- or alkenyl-N-monoalkyl- or alkenyl-N'-optionally alkyl- or alkenyl-N'-formyl, alkyl- or phenyl-carbonyl or -oxy-carbonyl (optionally halogen substituted with the phenyl radicals further optionally alkyl substituted) - thionothiolphosphoric acid ester amides, which possess nematocidal, insecticidal, acaricidal, and plant growth-promoting properties, active compositions in the form of mixtures of such compounds with solid and liquid dispersible carrier vehicles, and methods for producing such compounds and for using such compounds in a new way especially for combating pests, e.g. nematodes, insects and acarids, or for promoting growth of plants, with other and further objects becoming apparent from a study of the within specification and accompanying examples.

It is already known from German published specifications 1,148,806 and 1,143,052, that certain O,O-dialkyl-S-(N-alkyl - N - acylcarbamylmethyl)-thionothiolphosphoric acid esters, for example O,O-diethyl-S-(N-methyl-N - carboethoxy-carbamylmethyl)-thionothiolphosphoric acid ester (Compound A), possess insecticidal and acaricidal activity.

The present invention provides, as new compounds, the O - alkyl - N - monoalkyl-S-(N'-acyl-carbamylmethyl)-thionothiolphosphoric acid ester amides of the general formula

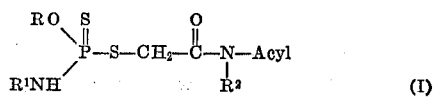
(I)

in which

R and $R^1$ each is an alkyl or alkenyl radical with up to 6 carbon atoms,
$R^2$ is hydrogen or an alkyl or alkenyl radical with up to 6 carbon atoms, and
Acyl is an HCO-, alkyl-CO- or alkoxy-CO- radical optionally substituted by halogen or a phenyl-CO- or phenoxy-CO- radical optionally substituted by halogen or an alkyl radical.

These new compounds are distinguished by strong nematocidal, insecticidal and acaricidal properties.

The present invention also provides a process for the preparation of a compound of the Formula I in which an O-alkyl-N-monoalkyl-thionothiolphosphoric acid ester amide of the general formula

(II)

in which

R and $R^1$ have the meanings stated above, and
M denotes an alkali metal equivalent, an alkaline earth metal equivalent or an optionally alkyl-substituted ammonium equivalent, is reacted with a haloacetic acid amide of the general formula

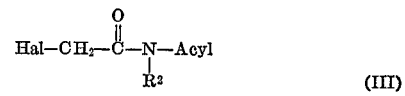
(III)

in which $R^2$ and Acyl have the meanings stated above, and
Hal is a halogen atom, preferably a chlorine or bromine atom.

Surprisingly, the new O-alkyl-N-monoalkyl-S-(N'-acyl-carbamylmethyl)-thionothiolphosphoric acid ester amides of the Formula I show, with comparable insecticidal and acaricidal properties, a remarkably better nematocidal activity than the known O,O-dialkyl-S-(N-alkyl-N-acyl-carbamylmethyl)-thionothiolphosphoric acid esters, which are the chemically most closely comparable active compounds of the same type of activity. Moreover, some of the new compounds have noteworthy plant-growth-promoting properties. The compounds according to the invention therefore represent a genuine enrichment of the art.

If, for example, the sodium salt of O-ethyl-N-monoisopropyl-thionothiolphosphoric acid ester amide and N-methyl-N-carboethoxychloroacetic acid amide are used as starting materials, the reaction course can be represented by the following equation:

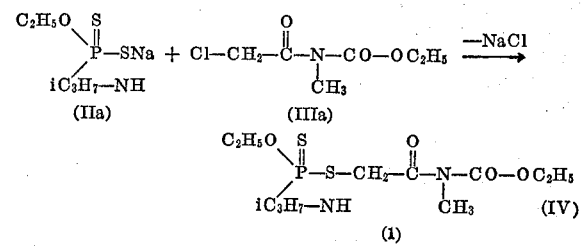

Preferably, R, R¹ and R² each is a straight-chain branched or cyclic alkyl radical or a straight chain or branched alkenyl radical with up to 6 carbon atoms, or R² may alternatively be hydrogen; most preferably R, R¹ and R² are each a straight-chain or branched lower alkyl radical with 1–4 carbon atoms, namely methyl, ethyl, n- or isopropyl or n-, iso-, sec.- or tert.-butyl or R² is hydrogen. Preferably, acyl is a formyl, lower fatty acyl, benzoyl or carbo-lower alkoxy or -phenoxy group which may be substituted by chlorine or bromine; the phenyl radicals also may be substituted by lower alkyl. As examples of the starting materials of the Formula II which can be used, there are mentioned: the potassium, sodium or ammonium salts of O-methyl-N-methyl-, O-methyl-N-ethyl-, O-methyl-N-n-propyl-, O-methyl-N-isopropyl-, O-methyl-N(n-, iso-, sec.- or tert.-)butyl, O-ethyl-N-methyl-, O-ethyl-N-ethyl-, O-ethyl-N-n-propyl-, O-ethyl-N-isopropyl-, O-ethyl-N-(n-, iso-, sec.- or tert.-)butyl-, O-n-propyl-N-methyl-, O-n-propyl-N-ethyl-, O-n-propyl-N-n-propyl-, O-n-propyl-N-isopropyl-, O-n-propyl-N-(n-, iso-, sec.- or tert.-)butyl-, O-isopropyl-N-methyl-, O-isopropyl-N-ethyl-, O-isopropyl-N-n-propyl-, O-isopropyl-N-isopropyl-, O-isopropyl-n-(n-, iso-, sec.- or tert.-)butyl-, O-(n-, iso-, sec.- or tert.-)butyl-N-methyl-, O-(n-, iso-, sec.- or tert.-)butyl-N-ethyl-, O-(n-, iso-, sec.- or tert.-)butyl-N-isopropyl-thionothiolphosphoric acid ester amides, and the like.

As solvents or diluents in carrying out the process, practically all inert organic solvents or diluents are suitable, especially aliphatic and aromatic optionally chlorinated hydrocarbons, such as benzene, toluene, xylenes, benzine, methylene chloride, chloroform, carbon tetrachloride and chlorobenzene; ethers, such as diethyl ether, dibutyl ether and dioxane; ketones, such as acetone and methylethyl, methylisopropyl and methylisobutyl ketones; nitriles, such as acetonitrile; and alcohols, such as methanol, ethanol and isopropanol; and the like. In some cases also water is suitable as solvent or diluent. The reaction temperatures, can be varied within a fairly wide range. In general, the work is carried out at about 0° to 120°, preferably at about 15 to 50° C.

The reaction is, in general, carried out at normal pressure.

When carrying out the process, the reactants are in most cases used in equimolar amounts. An excess of one or the other of the reactants brings no substantial advantage.

The reaction preferably takes place in one of the above-mentioned solvents. The reaction solution is expediently stirred afterwards for some hours, and is then worked up according to customary methods.

The compounds of this invention are obtained, in most cases, in the form of colorless to slightly yellow-colored, water-insoluble oils which cannot be distilled without decomposition but which can, by so-called "slight distillation," that is by longer heating to moderately elevated temperatures under reduced pressure, be freed from the last volatile components and in this way be purified. The refractice index is especially suitable for the characterization of the new compounds. Solid compounds are characterized by their melting points. As already mentioned, the compounds of this invention are distinguished by outstanding nematocidal, insecticidal and acaricidal activity. They possess a good effectiveness against both sucking and biting insects, Diptera and mites as well as a systemic activity. They may therefore be used successfully in crop protection, protection of stored goods and in the hygiene field against the most diverse animal pests.

To the sucking insects contemplated herein there belong, in the main, aphids (Aphidae) such as the green peach aphid (Myzus persicae), the bean aphid (Doralis fabae), the bird cherry aphid (Rhopalosiphum padi), the pea aphid (Macrosiphum pisi) and the potato aphid (Macrosiphum solanifolii), the currant gall aphid (Cryptomyzus korschelti), the rosy apple aphid (Sappaphis mali), the mealy plum aphid (Hyalopterus arundinis) and the cherry black-fly (Myzus cerasi); in addition, scales and mealybugs (Coccina), for example the oleander scale (Aspidiotus hederae) and the soft scale (Lecanium hesperidum) as well as the grape mealybug (Pseudococcus maritimus); thrips (Thysanoptera), such as Hercinothrips femoralis, and bugs, for example the beet bug (Piesma quadrata), the red cotton bug (Dysdercus intermedius), the bed bug (Cimex lectularius), the assassin bug (Rhodnius prolixus) and Chagas' bug (Triatoma infestans) and, further, cicadas, such as Euscelis bilobatus and Nephotettix bipunctatus; and the like.

In the case of the biting insects contemplated herein, above all there should be mentioned butterfly caterpillars (Lepidoptera) such as the diamond-back moth (Plutella maculipennis), the gypsy moth (Lymantria dispar), the brown-tail moth (Euproctis chrysorrhoea) and tent caterpillar (Malacosoma neustria); further, the cabbage moth (Mamestra brassicae) and the cutworm (Agrotis segetum), the large white butterfly (Pieris brassicae), the small winter moth (Cheimatobia brumata), the green oak tortrix moth (Tortrix viridana), the fall armyworm (Laphygma frugiperda) and cotton worm (Prodenia litura), the ermine moth (Hyponomeuta padella), the Mediterranean flour moth (Ephestia kühniella) and greater wax moth (Galleria mellonella); and the like Also to be classed with the biting insects contemplated herein are beetles (Coleoptera), for example the granary weevil (Sitophilus granarius-Calandra granaria), the Colorado beetle (Leptinotarsa decemlineata), the dock beetle (Gastrophysa viridula), the mustard beetle (Phaedon cochleariae), the blossom beetle (Meligethes aeneus), the raspberry beetle (Byturus tomentosus), the bean weevil (Bruchidius-Acanthoscelides obtectus), the leather beetle (Dermestes frischi), the khapra beetle (Trogoderma granarium), the flour beetle (Tribolium castaneum), the northern corn billbug (Calandra or Sitophilus zeamais), the drugstore beetle (Stegobium paniceum), the yellow mealworm (Tenebrio molitor) and the sawtoothed grain beetle (Oryzaephilus surinamensis), and also species living in the soil, for example wireworms (Agriotes spec.) and larvae of the cockchafer (Melolontha melolontha); cockroaches, such as the German cockroach (Blattella germanica), American cockroach (Periplaneta americana), Maderia cockroach (Leucophaea or Rhyparobia maderae), oriental cockroach (Blatta orientalis), the giant cockroach (Blaberus giganteus) and the black giant cockroach (Blaberus fuscus) as well as Henschoutedenia flexivitta; further, Orthoptera, for example the house cricket (Acheta domesticus); termites such as the eastern subterranean termite (Reticulitermes flavipes) and Hymenoptera such as ants, for example the garden ant (Lasius niger); and the like.

The Diptera contemplated herein comprises essentially the flies, such as the vinegar fly (Drosophila melanogaster), the Mediterranean fruit fly (Ceratitis capitata), the house fly (Musca domestica), the little house fly (Fannia canicularis), the black blow fly (Phormia regina) and bluebottle fly (Calliphora erythrocephala) as well as the stable fly (Stomoxys calcitrans); further, gnats, for example mosquitoes such as the yellow fever mosquito (Aedes aegypti), the northern house mosquito (Culex pipiens) and the malaria mosquito (Anopheles stephensi); and the like.

With the mites (Acarina) contemplated herein there are classed, in particular, the spider mites (Tetranychidae) such as the two-spotted spider mite (Tetranychus telarius=Tetranychus althaeae or Tetranychus urticae) and the European red mite (Paratetranychus pilosus= Panonychus ulmi), gall mites, for example the black currant gall mite (Eriophyes ribis) and tarsonemids, for example the broad mite (Hemitarsonemus latus) and the cyclamen mite (Tarsonemus pallidus); finally, ticks, such as the relapsing fever tick (Ornithodorus moubata); and the like.

When applied against pests harmful to health and pests of stored products, particularly flies and mosquitoes, the compounds of the present invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated alipahtic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, clays, alumina, silica, chalk, i.e. calcium carbonate, talc, attapulgite, montomorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other nematocides, insecticides, acaricides, and growth regulating agents, of fungicides, bactericides, rodenticides, herbicides, fertilizers, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist from, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids and nematodes or of promoting the growth of plants which comprises applying to at least one of correspondingly (a) such insects, (b) such acarids, (c) such nematodes, (d) such plants and (e) the corresponding habitat thereof, i.e. the area to be protected or in which plants are to be grown, a correspondingly combative or toxic amount, i.e. an insecticidally, acaricidally, nematocidally or plant growth-effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Plutella test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamondback moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from Table 1.

TABLE 1
[Plutella test]

| Active compounds | Concentration of active compound (percent) | Degree of destruction (percent) after 3 days |
|---|---|---|
| (B) $(CH_3O)_2\overset{S}{\overset{\|}{P}}-S-CH_2-\overset{O}{\overset{\|}{C}}-N(CH_3)-CHO$ (known) | 0.1 / 0.01 | 100 / 0 |
| (C) $(C_2H_5O)_2\overset{S}{\overset{\|}{P}}-S-CH_2-\overset{O}{\overset{\|}{C}}-N(CH_3)-CHO$ (known) | 0.1 / 0.01 | 70 / 0 |
| (A) $(C_2H_5O)_2\overset{S}{\overset{\|}{P}}-S-CH_2-\overset{O}{\overset{\|}{C}}-N(CH_3)-\overset{O}{\overset{\|}{C}}-OC_2H_5$ (known) | 0.1 / 0.01 | 100 / 0 |
| (1) $\underset{i-C_3H_7-NH}{\overset{C_2H_5O}{\diagdown}}\overset{S}{\overset{\|}{P}}-S-CH_2-\overset{O}{\overset{\|}{C}}-N(CH_3)-\overset{O}{\overset{\|}{C}}-OC_2H_5$ | 0.1 / 0.01 | 100 / 100 |

EXAMPLE 2
Doralis test (systemic action)
Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

Bean plants (*Vicia faba*) which have been heavily infested with the bean aphid (*Doralis fabae*) are watered with the preparation of the active compound so that the preparation of active compound penetrates into the soil without wetting the leaves of the bean plants. The active compound is taken up by the bean plants from the soil and thus reaches the infested leaves.

After the specified period of time, the degree of destruction is determined as a percentage. 100% means that all the aphids are killed; 0% means that none of the aphids are killed.

The active compounds, the concentrations of the active compounds, the evaluation time and the results can be seen from the following Table 2.

TABLE 2
[Doralis test/systemic action]

| Active compounds | Concentration of active compound (percent) | Degree of destruction (percent) after 3 days |
|---|---|---|
| (A) $(C_2H_5O)_2\overset{S}{\overset{\|}{P}}-S-CH_2-\overset{O}{\overset{\|}{C}}-N(CH_3)-\overset{O}{\overset{\|}{C}}-OC_2H_5$ (known) | 0.1 / 0.01 | 100 / 0 |
| (2) $\underset{CH_3-NH}{\overset{C_2H_5O}{\diagdown}}\overset{S}{\overset{\|}{P}}-S-CH_2-\overset{O}{\overset{\|}{C}}-N(CH_3)-CHO$ | 0.1 / 0.01 / 0.001 | 100 / 100 / 85 |
| (3) $\underset{CH_3-NH}{\overset{C_2H_5O}{\diagdown}}\overset{S}{\overset{\|}{P}}-S-CH_2-\overset{O}{\overset{\|}{C}}-N(CH_3)-\overset{O}{\overset{\|}{C}}-OC_2H_5$ | 0.1 / 0.01 / 0.001 | 100 / 99 / 45 |
| (4) $\underset{i-C_3H_7-NH}{\overset{C_2H_5O}{\diagdown}}\overset{S}{\overset{\|}{P}}-S-CH_2-\overset{O}{\overset{\|}{C}}-N(CH_3)-CHO$ | 0.1 / 0.01 | 100 / 90 |
| (5) $\underset{CH_3NH}{\overset{C_2H_5O}{\diagdown}}\overset{S}{\overset{\|}{P}}-S-CH_2-\overset{O}{\overset{\|}{C}}-NH-\overset{O}{\overset{\|}{C}}-OC_2H_5$ | 0.1 / 0.01 | 100 / 99 |

EXAMPLE 3
Tetranychus test

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10-30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3.

The preparation of active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown in and the pots are kept at a greenhouse temperature TABLE 3
[Tetranychus test]

| | | Concentration of active compound percent | Degree of destruction (percent) after 3 days |
|---|---|---|---|
| (B) | $(CH_3O)_2\overset{S}{\overset{\|}{P}}-S-CH_2-\overset{O}{\overset{\|}{C}}-\underset{\underset{CH_3}{\|}}{N}-CHO$ (Known) | 0.1 | 40 |
| (3) | $\underset{CH_3-NH}{\overset{C_2H_5O}{\diagdown}}\overset{S}{\overset{\|}{P}}-S-CH_2-\overset{O}{\overset{\|}{C}}-\underset{\underset{CH_3}{\|}}{N}-\overset{O}{\overset{\|}{C}}-OC_2H_5$ | 0.1 | 90 |
| (1) | $\underset{i-C_3H_7-NH}{\overset{C_2H_5O}{\diagdown}}\overset{S}{\overset{\|}{P}}-S-CH_2-\overset{O}{\overset{\|}{C}}-\underset{\underset{CH_3}{\|}}{N}-\overset{O}{\overset{\|}{C}}-OC_2H_5$ | 0.1 | 98 |

EXAMPLE 4

Critical concentration test

Test nematode: Meloidogyne sp.
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration.

of 27° C. After 4 weeks, the lettuce roots are examined for infestation with nematodes, and the degree of destruction of the active compound is determined as a percentage. The degree of effectiveness is 100% when infestation is completely avoided; it is 0% when the infestation is exactly the same as in the case of the control plants in untreated soil which has been infested in the same manner.

The active compounds, the amounts of applied and the results can be seen from the following Table 4.

TABLE 4
[Nematocides/*Meloidogyne incognita*]

| Active compound (constitution) | Degree of destruction (percent) with a concentration of active compound of— | | | | | | |
|---|---|---|---|---|---|---|---|
| | 50 p.p.m. | 40 p.p.m. | 20 p.p.m. | 10 p.p.m. | 5 p.p.m. | 2.5 p.p.m. | 1.25 p.p.m. |
| (1) $\underset{i-C_3H_7-NH}{\overset{C_2H_5O}{\diagdown}}\overset{S}{\overset{\|}{P}}-S-CH_2-\overset{O}{\overset{\|}{C}}-\underset{\underset{CH_3}{\|}}{N}-\overset{O}{\overset{\|}{C}}-OC_2H_5$ | 100 | 100 | 100 | 99 | 98 | 50 | |
| (4) $\underset{i-C_3H_7-NH}{\overset{C_2H_5O}{\diagdown}}\overset{S}{\overset{\|}{P}}-S-CH_2-\overset{O}{\overset{\|}{C}}-\underset{\underset{CH_3}{\|}}{N}-CHO$ | 100 | 100 | 100 | 100 | 99 | 95 | 50 |
| (B) $(CH_3O)_2\overset{S}{\overset{\|}{P}}-S-CH_2-\overset{O}{\overset{\|}{C}}-\underset{\underset{CH_3}{\|}}{N}-CHO$ (known) | 0 | | | | | | |
| (C) $(C_2H_5O)_2\overset{S}{\overset{\|}{P}}-S-CH_2-\overset{O}{\overset{\|}{C}}-\underset{\underset{CH_3}{\|}}{N}-CHO$ (known) | 0 | | | | | | |
| (A) $(C_2H_5O)_2\overset{S}{\overset{\|}{P}}-S-CH_2-\overset{O}{\overset{\|}{C}}-\underset{\underset{CH_3}{\|}}{N}-\overset{O}{\overset{\|}{C}}-OC_2H_5$ (known) | 0 | | | | | | |

The preparative process of the present invention is illustrated in and by the following example.

EXAMPLE 5

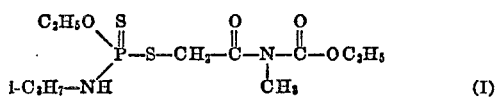
(I)

To 48.6 g. (0.22 mole) of sodium salt of O-ethyl-N-monoisopropyl-thionothiolphosphoric acid ester amide in 200 cc. of acetonitrile there are slowly added at room temperature 35.9 g. (0.2 mole) of N-methyl-N-carboethoxy-chloroacetic acid amide. The mixture is afterwards stirred overnight at room temperature; it is poured into water and taken up in benzene. The organic phase is washed neutral with water, dried over sodium sulfate, filtration is effected and the filtrate is concentrated. 65.0 g. (95.1% of theory) of O - ethyl - N - monoisopropyl-S-(N'-methyl-N'-carboethoxy-carbamylmethyl)-thionothiolphosphoric acid ester amide are obtained as a brown oil refractive index $n_D^{30}$ of 1.5181. At 40° C. the reaction proceeds in shorter time.

In an analogous manner, the following compounds can be prepared:

| | Constitution | Refractive index or melting point |
|---|---|---|
| (3) | C₂H₅O–P(S)(CH₃–NH–)–S–CH₂–C(O)–N(CH₃)–C(O)–OC₂H₅ | $n_D^{29}=1.5318$ |
| (2) | C₂H₅O–P(S)(CH₃–NH–)–S–CH₂–C(O)–N(CH₃)–C(O)–H | $n_D^{27}=1.5581$ |
| (4) | C₂H₅O–P(S)(i-C₃H₇–NH–)–S–CH₂–C(O)–N(CH₃)–C(O)–H | $n_D^{27.5}=1.5399$ |
| (5) | C₂H₅O–P(S)(CH₃–NH–)–S–CH₂–C(O)–NH–C(O)–OC₂H₅ | $n_D^{28}=1.5380$ |
| (6) | C₂H₅O–P(S)(i-C₃H₇–NH–)–S–CH₂–C(O)–NH–C(O)–OC₂H₅ | $n_D^{24}=1.5258$ |
| (7) | C₂H₅O–P(S)(sec.-C₄H₉–NH–)–S–CH₂–C(O)–N(CH₃)–C(O)–H | $n_D^{23}=1.5392$ |
| (8) | C₂H₅O–P(S)(i-C₄H₉–NH–)–S–CH₂–C(O)–N(CH₃)–C(O)–H | $n_D^{25.5}=1.5372$ |
| (9) | n-C₃H₇O–P(S)(i-C₃H₇–NH–)–S–CH₂–C(O)–N(CH₃)–C(O)–H | $n_D^{24.5}=1.5341$ |
| (10) | n-C₃H₇O–P(S)(i-C₃H₇–NH–)–S–CH₂–C(CH₃)(=O)–N–C(=O)–OC₂H₅ | $n_D^{20.5}=1.5150$ |
| (11) | C₂H₅O–P(S)(sec.-C₄H₉–NH–)–S–CH₂–C(CH₃)(=O)–N–C(=O)–OC₂H₅ | $n_D^{21}=1.5185$ |
| (12) | C₂H₅O–P(S)(i-C₄H₉–NH–)–S–CH₂–C(CH₃)(=O)–N–C(=O)–OC₂H₅ | $n_D^{21}=1.5170$ |
| (13) | C₂H₅O–P(S)(CH₂=CH–CH₂–NH–)–S–CH₂–C(CH₃)(=O)–N–C(=O)–OC₂H₅ | $n_D^{25}=1.5271$ |
| (14) | C₂H₅O–P(S)(CH₂=CH–CH₂–NH–)–SCH₂–C(O)–N(CH₃)–C(O)–H | $n_D^{25.5}=1.5550$ |
| (15) | C₂H₅O–P(S)(i-C₃H₇–NH–)–S–CH₂–C(O)–NH–C(O)–CH₃ | $n_D^{24}=1.5419$ |

TABLE—Continued

| | Constitution | Refractive index or melting point |
|---|---|---|
| (16) | C₂H₅O\P(=S)(-S-CH₂-C(=O)-N(CH₃)-C(=O)-CH₃)/i-C₃H₇NH | $n_D^{23}=1.5393$ |
| (17) | C₂H₅O\P(=S)(-S-CH₂-C(=O)-N(CH₃)-C(=O)-H)/C₆H₁₁-NH | $n_D^{21}=1.5559$ |
| (18) | C₂H₅O\P(=S)(-S-CH₂-C(=O)-N(CH₃)-C(=O)-OC₂H₅)/C₆H₁₁-NH | $n_D^{23}=1.5324$ |
| (19) | C₂H₅O\P(=S)(-S-CH₂-C(=O)-N(n-C₃H₇)-C(=O)-OC₂H₅)/i-C₃H₇-NH | $n_D^{27}=1.5072$ |
| (20) | C₂H₅O\P(=S)(-S-CH₂-C(=O)-N(CH₃)-C(=O)-O-C₆H₃(CH₃)₂)/i-C₃H₇-NH | M.P. 82° C. |
| (21) | C₂H₅O\P(=S)(-S-CH₂-C(=O)-N(CH₃)-C(=O)-O-C₆H₄-Cl)/i-C₃H₇-NH | $n_D^{21}=1.5621$ |

It will be appreciated that the instant specification and examples are set forth by way of illustration and not limitation, and that various modifications and changes may be made without departing from the spirit and scope of the present invention.

What is claimed is:

1. The O - alkyl - N-monoalkyl-S-(N'-acyl-carbamylmethyl)-thionothiolphosphoric acid ester amides of the general formula

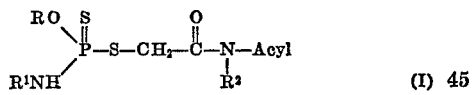   (I)

in which

R and R¹ each is an alkyl or alkenyl radical with up to 6 carbon atoms,

R² is hydrogen or an alkyl or alkenyl radical with up to 6 carbon atoms, and

Acyl is an HCO—, alkyl-CO- or alkoxyo-CO- radical optionally substituted by chlorine or bromine, or a phenyl-CO- or phenoxy-CO- radical optionally substituted by chlorine, bromine or alkyl radicals.

2. Compounds according to claim 1 in which R and R¹ each is an alkyl radical with 1–4 carbon atoms, R² is a hydrogen atom or an alkyl radical with 1–4 carbon atoms acyl is a formyl, lower fatty acyl, benzoyl or carbo-lower alkoxy or -phenoxy group optionally substituted by chlorine or bromine, the phenyl radicals optionally being substituted also by lower alkyl groups.

3. The compound according to claim 1 wherein such compound is O-ethyl-N-monoisopropyl-S-(N'-methyl-N'-carboethaoxy - carbamylmethyl) - thionothiolphosphoric acid ester amide of the formula

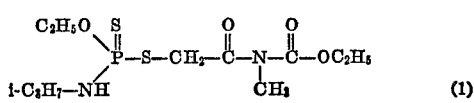   (1)

4. The compound according to claim 1 wherein such compound is O - ethyl - N-monomethyl-S-(N'-methyl-N'-formyl - carbamylmethyl) - thionothiolphosphoric acid ester amide of the formula

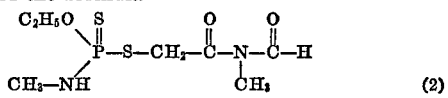   (2)

5. The compound according to claim 1 wherein such compound is O - ethyl - N - monomethyl-S-(N'-methyl-N'-carboethoxycarbamylmethyl) - thionothiolphosphoric acid ester amide of the formula

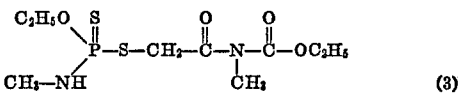   (3)

6. The compound according to claim 1 wherein such compound is O-ethyl-N-monoisopropyl-S-(N'-methyl-N'-formyl - carbamylmethyl) - thionothiolphosphoric acid ester amide of the formula

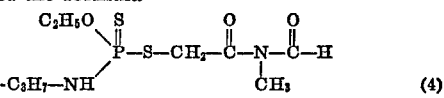   (4)

7. The compound according to claim 1 wherein such compound is O-ethyl-N-monomethyl-S-(N'-carboethoxycarbamylmethyl) - thionothiolphosphoric acid ester amide of the formula

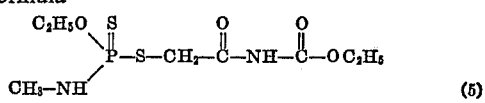   (5)

References Cited
UNITED STATES PATENTS

| | | | |
|---|---|---|---|
| 2,864,849 | 12/1958 | Schrader | 260—943 |
| 3,022,215 | 2/1962 | Schuler | 260—943 X |
| 3,176,035 | 3/1965 | Lutz et al. | 260—943 |
| 3,351,679 | 11/1967 | Szabo et al. | 260—943 |
| 3,600,471 | 8/1971 | Haubein | 260—938 |

LEWIS GOTTS, Primary Examiner

R. L. RAYMOND, Assistant Examiner

U.S. Cl. X.R.

260—943; 424—211

UNITED STATES PATENT OFFICE
CERTIFICATE OF CORRECTION

Patent No. 3,752,871　　　　　　Dated August 14, 1973

Inventor(s) Claus Stolzer et al　　　　Page 1 of 2

It is certified that error appears in the above-identified patent and that said Letters Patent are hereby corrected as shown below:

Col. 2, lines 66 and 70, in the formula, change " $iC_3H_7\text{-}NH^{\nearrow P}$ "

to -- $iC_3H_7\text{-}NH^{\searrow P}$ --.

Col. 7, Table 1, Compound (1), in the formula, insert between "P" and "S" a dash -- - --.

Col. 7, line 67, cancel in its entirety.

Col. 7, before line 73, insert -- After the specified period of time, the degree of de- --.

Col. 8, Table 2, in the heading of the last column, change "3 days" to -- 4 days --.

Col. 9, Table 3, in the heading above the chemical formulas, insert -- Active compounds --. In the heading of the last column, change "3 days" to -- 2 days --.

Col. 9, Table 3, Compound (B), correct formula to read as follows:

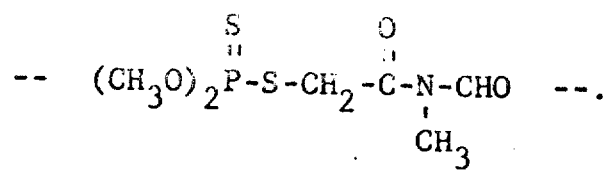

UNITED STATES PATENT OFFICE
CERTIFICATE OF CORRECTION

Patent No. 3,752,871            Dated

Inventor(s)

It is certified that error appears in the above-identified patent and that said Letters Patent are hereby corrected as shown below:

Col. 9, Table 3, Compound (3), correct formula to read as follows:

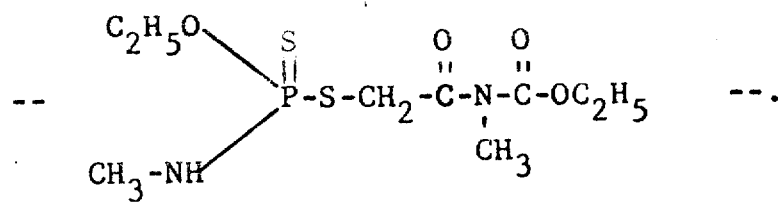

Col. 11 and 12, Example 5, in the Table, Compound 14, at the end of the formula, change "O" to -- O --.

Col. 13, line 60 (claim 2), after "atoms" insert -- , and --.

Signed and sealed this 1st day of October 1974.

(SEAL)
Attest:

McCOY M. GIBSON JR.
Attesting Officer

C. MARSHALL DANN
Commissioner of Patents